(12) United States Patent
O'Neil et al.

(10) Patent No.: US 10,829,609 B2
(45) Date of Patent: Nov. 10, 2020

(54) SILICONE RUBBER SYNTACTIC FOAM

(71) Applicant: Elkem Silicones USA Corp., East Brunswick, NJ (US)

(72) Inventors: Virginia O'Neil, Richmond Hill, GA (US); Jessica Hanley, Allentown, PA (US); Matthew Kihara, Lake Wylie, SC (US); Leeanne Brown, York, SC (US); Michael John Watson, Fort Mill, SC (US); Matthew Paul Timmons, Charlotte, NC (US)

(73) Assignee: Elkem Silicones USA Corp., East Brunswick, NJ (US)

( * ) Notice: Subject to any disclaimer, the term of this patent is extended or adjusted under 35 U.S.C. 154(b) by 71 days.

(21) Appl. No.: 15/890,758

(22) Filed: Feb. 7, 2018

(65) Prior Publication Data

US 2018/0223069 A1    Aug. 9, 2018

Related U.S. Application Data

(60) Provisional application No. 62/456,484, filed on Feb. 8, 2017.

(51) Int. Cl.

| | |
|---|---|
| *C08K 3/34* | (2006.01) |
| *C08J 9/32* | (2006.01) |
| *C08J 3/24* | (2006.01) |
| *C08G 77/38* | (2006.01) |
| *C08L 83/04* | (2006.01) |
| *C08G 77/00* | (2006.01) |
| *C08G 101/00* | (2006.01) |
| *C08G 77/20* | (2006.01) |
| *C08G 77/12* | (2006.01) |
| *C08K 3/38* | (2006.01) |

(52) U.S. Cl.
CPC ............... *C08J 9/32* (2013.01); *C08G 77/38* (2013.01); *C08J 3/24* (2013.01); *C08L 83/04* (2013.01); *C08G 77/12* (2013.01); *C08G 77/20* (2013.01); *C08G 77/70* (2013.01); *C08G 2101/00* (2013.01); *C08G 2330/00* (2013.01); *C08J 2207/00* (2013.01); *C08J 2383/04* (2013.01); *C08K 3/34* (2013.01); *C08K 3/38* (2013.01)

(58) Field of Classification Search
CPC .............. C08K 3/34; C08K 3/38; C08L 83/08
USPC ...................... 524/588; 528/31, 15
See application file for complete search history.

(56) References Cited

U.S. PATENT DOCUMENTS

| | | | |
|---|---|---|---|
| 3,933,712 A * | 1/1976 | Vanaglash, Jr. ......... | C08L 83/04 523/219 |
| 4,418,127 A | 11/1983 | Shambaugh et al. | |
| 4,433,069 A | 2/1984 | Harper et al. | |
| 5,614,563 A | 3/1997 | Ishida et al. | |
| 8,142,698 B2 * | 3/2012 | Ozai ....................... | C08L 83/04 264/108 |
| 8,367,233 B2 | 2/2013 | Hermann et al. | |
| 8,907,006 B1 * | 12/2014 | Rincon ................... | C08K 5/544 427/215 |
| 2007/0135590 A1 * | 6/2007 | Kotani .................... | C08L 43/04 525/479 |
| 2007/0259258 A1 | 11/2007 | Buck | |
| 2008/0234426 A1 | 9/2008 | Kotani et al. | |
| 2011/0245403 A1 | 10/2011 | Jeram et al. | |
| 2012/0003508 A1 | 1/2012 | Narbonne et al. | |
| 2013/0150535 A1 | 6/2013 | Griswold et al. | |

FOREIGN PATENT DOCUMENTS

| | | | |
|---|---|---|---|
| DE | 202005010708 U1 | | 9/2005 |
| EP | 326712 | * | 9/1989 |

\* cited by examiner

*Primary Examiner* — Maragret G Moore
(74) *Attorney, Agent, or Firm* — McBee Moore & Vanik IP, LLC

(57) ABSTRACT

The present invention relates to a novel silicone rubber syntactic foam and the silicone precursor of said foam.

9 Claims, 1 Drawing Sheet

SILICONE RUBBER SYNTACTIC FOAM

CROSS REFERENCE TO RELATED APPLICATIONS

This application claims priority to U.S. Provisional Application Ser. No. 62/456,484 filed Feb. 8, 2017, the content of which is incorporated herein by reference in its entirety.

BACKGROUND

Field of the Invention

The present invention relates to a novel silicone rubber syntactic foam and the silicone precursor of said silicone rubber syntactic foam. Such foam is useful when used in secondary battery pack which exhibit improved thermal management. Such silicone rubber syntactic foam is useful for an all-electric vehicle (EV), a plug-in hybrid vehicle (PHEV), a hybrid vehicle (HEV), or battery packs used for other vehicles batteries.

Description of Related Art

Batteries can be broadly classified into primary and secondary batteries. Primary batteries, also referred to as disposable batteries, are intended to be used until depleted, after which they are simply replaced with one or more new batteries. Secondary batteries, more commonly referred to as rechargeable batteries, are capable of being repeatedly recharged and reused, therefore offering economic, environmental and ease-of-use benefits compared to a disposable battery. Examples of the secondary batteries may include nickel-cadmium batteries, nickel-metal hybrid batteries, nickel-hydrogen batteries, lithium secondary batteries, etc.

Secondary batteries, in particular lithium-ion batteries, have emerged as a key energy storage technology and are now the main technology for consumer electronics devices, industrial, transportation, and power-storage applications.

Due to their high potential and their high energy and power densities, and also their good lifetime, secondary batteries are now the preferred battery technology, in particular in the automotive industry as it is now possible to provide longer driving range and suitable acceleration for electrically propelled vehicles such as Hybrid Electric Vehicles (HEVs), Battery Electric Vehicles (BEVs) and Plug-In Hybrid Electric Vehicles (PHEVs). In current automotive industry, different sizes and shapes of lithium-ion battery cells are being manufactured and are subsequently assembled into packs of different configurations. An automotive secondary battery pack typically consists of a large number of battery cells, sometimes several hundreds, even thousands, to meet desired power and capacity needs.

This switch in drive train technology is not, however, without its technological hurdles as the use of an electric motor translates to the need for inexpensive batteries with high energy densities, long operating lifetimes, and capability of operating in a wide range of conditions. Although rechargeable battery cells offer a number of advantages over disposable batteries, this type of battery is not without its drawbacks. In general, most of the disadvantages associated with rechargeable batteries are due to the battery chemistries employed, as these chemistries tend to be less stable than those used in primary cells. Secondary battery cells such as lithium-ion cells tend to be more prone to thermal management issues which occur when elevated temperatures trigger heat-generating exothermic reactions, raising the temperature further and potentially triggering more deleterious reactions. During such an event, a large amount of thermal energy is rapidly released, heating the entire cell up to a temperature of 850° C. or more. Due to the increased temperature of the cell undergoing this temperature increase, the temperature of adjacent cells within the battery pack will also increase. If the temperature of these adjacent cells is allowed to increase unimpeded, they may also enter into an unacceptable state with exceedingly high temperatures within the cell, leading to a cascading effect where the initiation of temperature increases within a single cell propagate throughout the entire battery pack. As a result, power from the battery pack is interrupted and the system employing the battery pack is more likely to incur extensive collateral damage due to the scale of damage and the associated release of thermal energy. In a worst case scenario, the amount of generated heat is great enough to lead to the combustion of the battery as well as materials in proximity to the battery.

Furthermore, due to the characteristics of the lithium ion batteries, the secondary battery pack operates within an ambient temperature range of −20° C. to 60° C. However, even when operating within this temperature range, the secondary battery pack may begin to lose its capacity or ability to charge or discharge should the ambient temperature fall below 0° C. Depending on the ambient temperature, the life cycle capacity or charge/discharge capability of the battery may be greatly reduced as the temperature stays below 0° C. Nonetheless, it may be unavoidable that the lithium ion battery be used where the ambient temperature falls outside the optimum ambient temperature range which is between 20° C. to 25° C. These factors not only greatly shorten the driving range of vehicle, but also cause a great damage to battery Deterioration in energy and power available at lower temperatures is attributed to reduction in capacity and increase in internal resistance.

Alluding to the above, in a battery or battery assembly with multiple cells, significant temperature variances can occur from one cell to the next, which is detrimental to performance of the battery pack. To promote long life of the entire battery pack, the cells must be below a desired threshold temperature. To promote pack performance, the differential temperature between the cells in the secondary battery pack should be minimized. However, depending on the thermal path to ambient, different cells will reach different temperatures. Further, for the same reasons, different cells reach different temperatures during the charging process. Accordingly, if one cell is at an increased temperature with respect to the other cells, its charge or discharge efficiency will be different, and, therefore, it may charge or discharge faster than the other cells. This will lead to decline in the performance of the entire pack.

A number of approaches have been employed to either reduce the risk of thermal issues, or reduce the risk of thermal propagation. These can be found in U.S. Pat. No. 8,367,233 which discloses a battery pack thermal management system that comprises at least one enclosure failure port integrated into at least one wall of a battery pack enclosure, where the enclosure failure port(s) remains closed during normal operation of the battery pack, and opens during a battery pack thermal event, thereby providing a flow path for hot gas generated during the thermal event to be exhausted out of the battery pack enclosure in a controlled fashion.

Another approach is to develop new cell chemistries and/or modify existing cell chemistries. Yet another approach is to provide additional shielding at the cell level, thus inhibiting the flow of thermal energy from the cell undergoing thermal management issues propagating to adjacent cells. Still yet another approach, is to use a spacer assembly to maintain the position of the battery undergoing the thermal event in its predetermined location within the battery pack, thereby helping to minimize the thermal effects on adjacent cells.

Thermally insulating a battery pack has also been described to reduce the risk of thermal excursions or their propagation. For example, document US 2007/0259258 describes a battery of lithium generators in which the generators are stacked one on another and this stack is held in position being surrounded by polyurethane foam. An embodiment is also disclosed in which cooling fins are inserted between two generators.

Document DE 202005010708 describes a starter lead-acid electrochemical generator and an electrochemical generator for industrial use whose housing contains plastic foam such as polypropylene or polyvinyl chloride having closed pores.

Document US2012/0003508 describes a battery of lithium electrochemical generators including a casing; a plurality of lithium electrochemical generators housed in the casing, each generator including a container; a rigid, flame-retardant foam with closed porosity formed of an electrically insulating material filling the space between the inner wall of the casing and the free surface of the side wall of the container of each electrochemical generator, the foam covering the free surface of the side wall of the container of each electrochemical generator over a length representing at least 25% of the height of the container. According to one embodiment, the foam consists of a material chosen from the group comprising polyurethane, epoxy, polyethylene, melamine, polyester, formophenol, polystyrene, silicone or a mixture thereof, polyurethane and the mixture of polyurethane and epoxy being preferred. The expansion of polyurethane resin for foam-form is described using the following chemical routes to obtain the foam:

a) via chemical route, i.e. the reaction of water on isocyanate producing $CO_2$ which will cause the polyurethane to foam;
b) via physical route, i.e. vaporization of a liquid with low boiling point under the action of heat produced by the exothermal reaction between isocyanate and the hydrogen-donor compound, or
c) via injection of air.

However, rigid foams which are typically produced by reacting for example a polyisocyanate with an isocyanate reactive material such as polyol in the presence of a blowing agent do not exhibit the high compression set required when foams are used to minimize the adverse effect of any fire and explosion linked to a thermal event.

In document U.S. Pat. No. 4,418,127 a modular lithium battery is described and having a plurality of cells, having electrical connecting means connecting the cells to output terminals, and venting means for releasing discharge byproducts to a chemical scrubber. Stainless steel cell casings are potted in an aluminum modular case with a syntactic epoxy foam, said foam being syntactic in nature to reduce weight and which has incorporated therein microballoons composed of compositions selected from the group consisting of glass and ceramics, and additives to reduce flammability.

Another major issue in the emerging electrical vehicle field is linked to the drivetrains used which integrate motor, automated manual transmission, shafts, and wheels with the final drive to control speed and generate larger torque for driving the vehicle. The main difference compared to traditional fuel-consuming vehicles is that there is no clutch or hydraulic torque converter in electric vehicles so the overall system configuration is less elastic inherently as the motor and the transmission system are directly mechanically coupled. This configuration has little passive damping effect that can dampen disturbances and avoid oscillations, which are mostly noticeable during travel in the low speed range. Indeed, the dominating sound is the magnetic noise which generates a whining noise at high frequencies. A vehicle running only with an electric motor will also have less masking sound at low frequencies. This means that other noise requirements on for example component noise such as liquid or air cooling/heating for the electrical batteries must be changed accordingly. The noise during regeneration (battery charging) at coast down is also important. Therefore, due to the low damping in an electrical vehicle and lack of passive damping hardware as compared with a conventional vehicle, a damping control strategy is needed to minimize the drivetrain oscillations.

While a number of approaches have been adopted to try to lower the risk of thermal incursions as well as thermal energy propagation throughout the battery pack, it is critical that if a pack-level thermal event does occur, personal and property risks are minimized. As the number of cells in a battery increases, and as the size of the cells increases, so does the necessity and benefit of providing suitable thermal management.

Furthermore, there is still a need to better insulate battery cells, in particular lithium-ion batteries from the adverse effect of low temperature that are met when the weather reaches severe low temperature that could reach −20° C. and even lower.

SUMMARY

In this context, one of the essential objectives of the present invention is to provide a novel silicone rubber syntactic foam and the silicone precursor of said silicone rubber syntactic foam which could be used in secondary battery pack and that will minimize personal and property risks due to uncontrolled thermal events as it is still awaited.

With the present invention, it is sought that the silicone rubber syntactic foam and the silicone precursor of said silicone rubber syntactic foam will address said problems linked to uncontrolled thermal excursions, in particular for lithium batteries, will present efficient low temperature insulation properties and will provide a damping control strategy to minimize the drivetrain oscillations.

All these objectives, among others, are achieved by the present invention, which relates to an addition curing type organopolysiloxane composition X comprises:

a) at least one organopolyosiloxane A of the following formula:

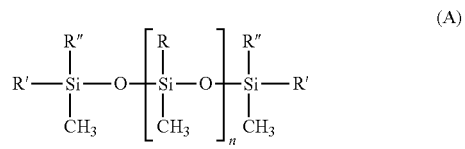

(A)

in which:
R and R", are chosen independently of one another from the group consisting of $C_1$ to $C_{30}$ hydrocarbon radical, and preferably R is an alkyl group chosen from the group consisting of methyl, ethyl, propyl, trifluoropropyl, and phenyl, and most preferably R is a methyl group, R' is a $C_1$ to $C_{20}$ alkenyl radical, and preferably R' is chosen from the group consisting of vinyl, allyl, hexenyl, decenyl and tetradecenyl, and most preferably R' is a vinyl radical, R" is an alkyl group such as a methyl, ethyl, propyl, trifluoropropyl, phenyl, and preferably R" is a methyl group, and n is an integer having a value from 5 to 1000, and preferably from 5 to 100, b) at least one silicon compound B comprising at least two hydrogen atoms bonded to silicon per molecule, and preferably a mixture of two silicon compounds B one comprising two telechelic hydrogen atoms bonded to silicon per molecule with no pendent hydrogen atoms bonded to silicon per molecule and the other comprising at least three hydrogen atoms bonded to silicon per molecule, c) an effective amount of hydrosilylation catalyst C, and preferably a platinum based hydrosilylation catalyst C.

d) hollow glass beads D, and preferably hollow borosilicate glass microspheres, e) at least one reactive diluent E for reducing the viscosity of the composition and which reacts through hydrosilylation reaction and is chosen from the group consisting of:

a silicon compound comprising a single silicon hydride group per molecule, and an organic compound containing a single ethylenically unsaturated group, preferably said organic compound is an organic α-olefin containing from 3 to 20 carbon atoms, and most preferably chosen from the group consisting of dodecene, tetradecene, hexadecene, octadecene and a combination of these and all with a terminal vinyl group, an organopolysiloxane having a single telechelic alkenyl group, and preferably said telechelic alkenyl group is chosen from the group consisting of vinyl, allyl, hexenyl, decenyl and tetradecenyl, and most preferably is a vinyl group, f) optionally at least one additives H such as a pigment, a dye, clays, a surfactant, hydrogenated castor oil, wollastonite, aluminium trihydrate, magnesium hydroxide, halloysite, huntite hydromagnesite, expandable graphite, zinc borate, mica or a fumed silica, and g) optionally at least one cure rate controller G which slows the curing rate.

To achieve this objective, the Applicant demonstrated, to its credit, entirely surprisingly and unexpectedly, that composition according to the invention could provide after curing a silicone rubber syntactic foam comprising hollow glass beads which makes it possible to overcome problems that were not solved by similar batteries using organic rubber syntactic foam.

DETAILED DESCRIPTION OF A PREFERRED EMBODIMENT

As used herein, the term "silicone rubber" includes the crosslinked product of any crosslinkable silicone composition. By "silicone rubber syntactic foam" it is meant a matrix made of silicone rubber in which is dispersed hollow glass beads.

Furthermore, it is well known that the driving range of an electric vehicle between charges is calculated at ambient temperature. Electric vehicle drivers are being made aware that frigid temperature reduces the available mileage. This loss is not only caused by heating the cabin electrically but by the inherent slowing of the battery's electrochemical reaction, which reduces the capacity while cold. So, the specific choice of silicone rubber as a binder within said syntactic foam makes it possible for said foam to exhibits excellent insulation in regard to low temperature close or below the freezing point.

Another advantage of using silicone rubber binders over organic rubber binders for a syntactic foam could be exemplified with the embrittlement (or loss of ductility) point, which is between −20° C. to −30° C. for typical organic rubber binder compared to −60° C. to −70° C. for binders according to the invention.

Another advantage is also linked to physical properties such as elasticity which remain efficient for a silicone rubber binder even at temperatures at which organic rubber binders turn brittle.

Another advantage of using a silicone syntactic foam according to the invention is that it has a very low water absorption and hence does isolate perfectly the battery cells from undesired water for its optimum uses. Indeed, contrary to silicone syntactic foams, a standard silicone foam contains only blown gas bubbles and have the voids completely, or at least partly, connected to each other, so with an ability to absorb and diffuse water, feature that makes it difficult to use it within an electrical vehicle in which the battery packs are most often positioned underneath the vehicle or in the vehicle floor and then rainy driving conditions could raise issues with such materials.

As differences in temperatures affect the resistance, self-discharge rate, coulombic efficiency, as well as the irreversible capacity and power fade rates of battery cells, over a wide range of chemistries, the secondary battery pack according to the invention allows for uniform thermal conditions for all cells in a battery pack or module. The likelihood of cell state of charge imbalance and of early failure of non-defective cells is therefore further minimized.

Indeed, the silicone rubber syntactic foam fills partially or fully the open space of said battery module casing and/or covering partially or totally said battery cells. The silicone rubber binder provides the syntactic foam with mechanical flexibility and thermal stability over a broad temperature range (e.g. from −70° C. to 200° C.). Additionally, the decomposition of the silicone rubber binder at temperatures of thermal excess (up to 850° C.) into silicon dioxide and silicon oxide absorbs a large amount of heat. Therefore, the heat diffusion from the unit cell to the neighboring unit cells can be effectively insulated by a thermal insulation barrier which is said silicone rubber syntactic foam. The thermal excursions are not propagated through the entire battery module and then threatening the safety of the user is thus prevented. In addition, for some battery modules having control circuit boards disposed in the battery module casing, the silicone rubber syntactic foam of the disclosure can be disposed between the battery cells and the circuit board and between battery cells and the connecting circuit to reduce the battery heating problem caused by the circuit board and the circuit.

The silicone formulation contains hollow glass beads and in a preferred embodiment said hollow glass beads have melting points similar to that of a thermal event occurring in a battery or a group of batteries in a pack so heating will soften and melt the glass reducing heat transfer and protecting other batteries around the overheating battery.

Hollow glass beads are employed in the syntactic foam of this invention, and function to reduce the density of the foam. Hollow glass beads, and in particular hollow glass microspheres are well suited for this application because, in addition to having excellent isotropic compressive strengths, they have the lowest density of any filler that would be useful in the manufacture of high compressive strength syntactic foam. The combination of high compressive strength and low density make hollow glass microspheres the filler with numerous advantages according to the invention.

According to one embodiment, hollow glass beads are hollow borosilicate glass microspheres also known as glass bubbles or glass microbubbles.

According to another embodiment, the hollow borosilicate glass microspheres have true densities ranging from 0.10 gram per cubic centimeter (g/cc) to 0.65 gram per cubic centimeter (g/cc).

The terms "true density" is the quotient obtained by dividing the mass of a sample of glass bubbles by the true volume of that mass of glass bubbles as measured by a gas pycnometer. The "true volume" is the aggregate total volume of the glass bubbles, not the bulk volume.

According to another embodiment, the level of hollow glass beads is up to 80% volume loading in the silicone rubber syntactic foam or of the liquid crosslinkable silicone composition precursor of said silicone rubber syntactic foam as described below, and most preferably between 5% and 70% by volume of the silicone rubber syntactic foam or of the liquid crosslinkable silicone composition precursor of said silicone rubber syntactic foam as described below.

According to a preferred embodiment, hollow glass beads are chosen from the 3M™ Glass Bubbles Floated Series (A16/500, G18, A20/1000, H20/1000, D32/4500 and H50/10,000EPX glass bubbles products) and 3M™ Glass Bubbles Series (such as but not limited to K1, K15, S15, S22, K20, K25, S32, S35, K37, XLD3000, S38, S38HS, S38XHS, K46, K42HS, S42XHS, S60, S60HS, iM16K, iM30K glass bubbles products) sold by 3M Company. Said glass bubbles exhibit various crush strengths ranging from 1.72 megapascal (250 psi) to 186.15 Megapascals (27,000 psi) at which ten percent by volume of the first plurality of glass bubbles collapses. Other glass bubbles sold by 3M such as 3M™ Glass Bubbles—Floated Series, 3M™ Glass Bubbles—HGS Series and 3M™ Glass Bubbles with Surface Treatment could also be used according to the invention.

According to a preferred embodiment said glass bubbles are chosen among those exhibiting crush strengths ranging from 1.72 megapascal (250 psi) to 186.15 Megapascals (27,000 psi) at which ten percent by volume of the first plurality of glass bubbles collapses.

According to a most preferred embodiment, hollow glass beads are chosen from the 3M™ Glass Bubbles series, S15, K1, K25, iM16K, S32 and XLD3000.

To fill the free spaces with silicone rubber syntactic foam according to the invention, it is possible:
a) either to use a liquid crosslinkable silicone composition precursor of a silicone rubber syntactic foam comprising hollow glass beads according to the invention, which, after injection or free flow comes to fill the free spaces and cures via crosslinking,
b) or to use a machined or previously molded block of a silicone rubber syntactic foam comprising hollow glass beads that is inserted in the casing at the time of assembly.

The use of a liquid crosslinkable silicone composition precursor of a silicone rubber syntactic foam comprising hollow glass beads in the battery facilitates the filling thereof compared with a standard liquid crosslinkable silicone precursor of a silicone foam as the foaming process of a standard foam creates blown gas bubbles and have the voids completely, or at least partly, connected to each other which causes numerous defects within the obtained silicone foam and filling problems.

Indeed, standard silicone foams are obtained by several methods, for example, by adding a thermally decomposable blowing agent, or by molding and curing while generating hydrogen gas by-product. In the method of adding a thermally decomposable blowing agent, the toxicity and odor of decomposed gases are problems. The method of utilizing hydrogen gas by-product during the curing step suffers from such problems as the potential explosion of hydrogen gas and the careful handling of uncured composition during shelf storage. Further, the gas generating method encounters difficulty in forming controlled uniform cells.

Furthermore, standard silicone foams contain only blown gas bubbles and have the voids completely, or at least partly, connected to each other, therefore giving very high level of water absorption whereas for silicone rubber syntactic foams according to the invention voids are due to the presence of hollow glass bead which are gas filled and therefore show very low level of water absorption.

The use of expandable silicone rubber syntactic foam facilitates the filling of empty space within the battery pack since the swell pressure pushes the foam into all the cavities and recesses of the geometry to be filled. Also, this method allows any geometry to be filled which is not possible using prefabricated blocks.

Addition curing type organopolysiloxane compositions according to the invention do not release reaction by-products so they can cure in closed environments. their cure can also be greatly accelerated by heat curing.

According to another preferred embodiment, the reactive diluent E:
is chosen from the group consisting of dodecene, tetradecene, hexadecene, octadecene or a combination of these and all having a terminal vinyl group, or
is a liquid organopolysiloxane with formula I

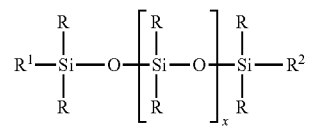

In which:
R are $R^2$, are chosen independently of one another from a $C_1$ to $C_{30}$ hydrocarbon radical, and preferably they are chosen from the group consisting of methyl, ethyl, propyl, trifluoropropyl and phenyl, and most preferably are methyl groups,
$R^1$ is a $C_1$ to $C_{20}$ alkenyl radical, and preferably $R^1$ is chosen from the group consisting of vinyl, allyl, hexenyl, decenyl, or tetradecenyl, and most preferably $R^1$ is vinyl, and
x is between 0 and 100, and is chosen so that it will lower the viscosity of addition curing type organopolysiloxane composition X compared to same composition without the reactive diluent.

According to a preferred embodiment organopolysiloxane A is chosen from the group of dimethylpolysiloxanes containing dimethylvinylsilyl end groups.

According to another preferred embodiment, wherein:
the viscosity at 25° C. of said organopolysiloxane A is between 5 mPa·s and 60000 mPa·s; and preferably between 5 mPa·s and 5000 mPa·s, and most preferably between 5 mPa·s and 350 mPa·s, the viscosity at 25° C. of said silicon compound B comprising two telechelic hydrogen atoms bonded to silicon per molecule with no pendent hydrogen atoms bonded to silicon per molecule is between 5 and 100 mPa·s, and the viscosity at 25° C. of said silicon compound B comprising at least three hydrogen atoms bonded to silicon per molecule is between 5 and 2000 mPa·s.

All the viscosities under consideration in the present specification correspond to a dynamic viscosity magnitude that is measured, in a manner known per se, at 25° C., with a machine of Brookfield type. As regards to fluid products, the viscosity under consideration in the present specification is the dynamic viscosity at 25° C., known as the "Newtonian" viscosity, i.e. the dynamic viscosity that is measured, in a manner known per se, at a sufficiently low shear rate gradient so that the viscosity measured is independent of the rate gradient.

According to a preferred embodiment, the viscosities at 25° C. of said organopolysiloxane A and said silicon compound B comprising at least two hydrogen atoms bonded to silicon per molecule are chosen so that the viscosity at 25° C. of the addition curing type organopolysiloxane composition X is between 500 mPa-s and 300,000 mPa-s. so that it can be injected into the battery module casing 102. If the option of pouring the composition within the battery module casing 102 is chosen, then the components of said addition curing type organopolysiloxane composition X are chosen so that its viscosity is between 500 mPa·s to 5000 mPa·s and most preferably between 500 mPa·s to 2500 mPa·s.

Examples of hydrosilylation catalysts C are hydrosilylation catalysts such as Karstedt's catalyst shown in U.S. Pat. No. 3,715,334 or other platinum or rhodium catalysts known to those in the art, and also including microencapsulated hydrosilylation catalysts for example those known in the art such as seen in U.S. Pat. No. 5,009,957. However, hydrosilylation catalysts pertinent to this invention can contain at least one of the following elements: Pt, Rh, Ru, Pd, Ni, e.g. Raney Nickel, and their combinations. The catalyst is optionally coupled to an inert or active support. Examples of preferred catalysts which can be used include platinum type catalysts such as chloroplatinic acid, alcohol solutions of chloroplatinic acid, complexes of platinum and olefins, complexes of platinum and 1,3-divinyl-1,1,3,3-tetramethyldisiloxane and powders on which platinum is supported, etc. The platinum catalysts are fully described in the literature. Mention may in particular be made of the complexes of platinum and of an organic product described in U.S. Pat. Nos. 3,159,601, 3,159,602 and 3,220,972 and European Patents EP-A-057,459, EP-188,978 and EP-A-190,530 and the complexes of platinum and of vinylated organopolysiloxane described in U.S. Pat. Nos. 3,419,593, 3,715,334, 3,377,432, 3,814,730, and 3,775,452, to Karstedt. In particular, platinum type catalysts are especially desirable.

Examples of cure rate controller G, which are also known as inhibitor, designed to slow the cure of the compounded silicone if needed. Cure rate controllers are well known in the art and examples of such materials can be found in U.S. patents. U.S. Pat. No. 3,923,705 refers to the use of vinyl contained cyclic siloxanes. U.S. Pat. No. 3,445,420 describes the use of acetylenic alcohols. U.S. Pat. No. 3,188,299 shows the effectiveness of heterocyclic amines. U.S. Pat. No. 4,256,870 describes alkyl maleates used to control cure. Olefinic siloxanes can also be used as described in U.S. Pat. No. 3,989,667. Polydiorganosiloxanes containing vinyl radicals have also been used and this art can be seen in U.S. Pat. Nos. 3,498,945, 4,256,870, and 4,347, 346. Preferred inhibitors for this composition are methylvinylcyclosiloxanes, 3-methyl-1-butyn-3-ol, and 1-ethynyl-1-cyclohexanol with the most preferred being the 1,3,5,7-tetramethyl-1,3,5,7-tetravinyl-cyclotetrasiloxane in amounts from 0.002% to 1.00% of the silicone compound depending on the cure rate desired.

The preferred cure rate controller G is chosen among:
1,3,5,7-tetramethyl-1,3,5,7-tetravinyl-cyclotetrasiloxane.
3-methyl-1-butyn-3-ol, and
1-ethynyl-1-cyclohexanol.

To obtain a longer working time or "pot life", the quantity of the cure rate controller G is adjusted to reach the desired "pot life". The concentration of the catalyst inhibitor in the present silicone composition is sufficient to retard curing of the composition at ambient temperature without preventing or excessively prolonging cure at elevated temperatures. This concentration will vary widely depending on the particular inhibitor used, the nature and concentration of the hydrosilylation catalyst, and the nature of the organohydrogenopolysiloxane. Inhibitor concentrations as low as one mole of inhibitor per mole of platinum group metal will in some instances yield a satisfactory storage stability and cure rate. In other instances, inhibitor concentrations of up to 500 or more moles of inhibitor per mole of platinum group metal may be required. The optimum concentration for a particular inhibitor in a given silicone composition can be readily determined by routine experimentation.

According to a preferred embodiment, for said addition curing type organopolysiloxane composition X the proportions in weight of the organopolysiloxane A, the reactive diluent E and the silicon compound B are such that the overall molar ratio of the hydrogen atoms bonded to the silicon to the overall alkenyl radicals bonded to the silicon is within a range from 0.35 to 10, and preferably within a range from 0.4 to 1.5.

Some additives H such as a pigment, a dye, clays, a surfactant, hydrogenated castor oil, wollastonite or a fumed silica (which modify the flow of the compounded silicone product) can also be used within said addition curing type organopolysiloxane composition X.

By "dye" it is meant a colored or fluorescent organic substance only, which impart color to a substrate by selective absorption of light. By "pigment" it is meant a colored, black, white or fluorescent particulate organic or inorganic solids which usually are insoluble in, and essentially physically and chemically unaffected by, the vehicle or substrate in which they are incorporated. It alters appearance by selective absorption and/or by scattering of light. A pigment generally retains a crystal or particulate structure throughout the coloration process. Pigments and dyes are well known in the art and need not be described in detail herein.

Clays are products that are already well known per se, which are described, for example, in the publication "Mineralogie des argiles [Mineralogy of clays], S. Caillere, S. Henin, M. Rautureau, 2nd Edition 1982, Masson". Clays are silicates containing a cation that may be chosen from calcium, magnesium, aluminium, sodium, potassium and lithium cations, and mixtures thereof. Examples of such products that may be mentioned include clays of the smectite family such as montmorillonites, hectorites, bentonites, beidellites and saponites, and also of the vermiculite, stevensite and chlorite families. These clays may be of natural or synthetic origin. The clay is preferably a bentonite or a hectorite, and these clays may be modified with a chemical compound chosen from quaternary amines, tertiary amines, amine acetates, imidazolines, amine soaps, fatty sulfates, alkyl aryl sulfonates and amine oxides, and mixtures thereof. Clay which can be used according to the invention, of synthetic hectorites (also known as laponites), such as the products sold by Laporte under the name Laponite XLG, Laponite RD and Laponite RDS (these products are sodium magnesium silicates and in particular lithium magnesium sodium silicates); bentonites, such as the product sold under the name Bentone HC by Rheox; magnesium aluminium silicates, in particular hydrated, such as the product sold by R.T. Vanderbilt Company under the name Veegum Ultra, or calcium silicates and in particular that in synthetic form sold by the company CELITE ET WALSH ASS under the name Micro-Cel C.

Many silicone polyether surfactants are available, but a preferred silicone polyether for thickening a silicone compound of this invention would be SP 3300 from Elkem Silicones USA.

Another preferred additive H is a rheology modifier such as Thixcin R, a hydrogenated castor oil, from Elementis Specialties, New Jersey, USA.

Wollastonite, also known as calcium metasilicate, is a naturally occurring mineral could be added as a flame retardant (quantities added will varies according to the application and will range between 1 part by weight to 15 parts by weight based on 100 parts by weight of the addition curing type organopolysiloxane composition X. The wollastonite which could be used in this invention is a mined form, having an acicular morphology, that is a needle-like shape. Preferred wollastonite grades are selected from materials supplied by NYCO® Minerals, Inc., Willsboro N.Y.

Aluminium trihydrate (ATH) is a common flame retardant filler. It decomposes when heated above 180-200° C. at which point it absorbs heat and releases water to quench the flame. Magnesium hydroxide has a higher thermal stability than ATH. Endothermic (heat absorbing) decomposition starts at 300° C. whereupon water is released which could act as a fire retardant.

Huntite/Hydromagnesite blends ($Mg_3Ca(CO_3)_4$/$Mg_5(CO_3)_4(OH)_2.4H_2O$). Huntite and hydromagnesite occur, almost invariably, as mixtures in nature. The hydromagnesite starts to decompose between 220° C. (open air) and 250° C. (under pressure in an extruder), which is high enough so that it can be used as a flame retardant. The hydromagnesite gives off water and absorbs heat, much like ATH and MDH do. In contrast, the huntite decomposes above 400° C., absorbing heat but liberating carbon dioxide.

Fumed silicas can also be used as additive H for changing the rheology of these materials. Fumed silicas can be obtained by high-temperature pyrolysis of a volatile silicon compound in an oxyhydrogen flame, producing a finely divided silica. This process makes it possible in particular to obtain hydrophilic silicas which have a large number of silanol groups at their surface which would tend to thicken a silicone composition more than silica with low levels of silanol. Such hydrophilic silicas are sold for example under the names Aerosil 130, Aerosil 200, Aerosil 255, Aerosil 300 and Aerosil 380 by Degussa and Cab-O-Sil HS-5, Cab-O-Sil EH-5, Cab-O-Sil LM-130, Cab-O-Sil MS-55 and Cab-O-Sil M-5 by Cabot. It is possible to chemically modify the surface of the said silica via a chemical reaction which brings about a reduction in the number of silanol groups. It is possible in particular to replace silanol groups with hydrophobic groups: a hydrophobic silica is then obtained. The hydrophobic groups can be:

trimethylsiloxyl groups, which are obtained in particular by treating fumed silica in the presence of hexamethyldisilazane. Silicas thus treated are known as "Silica silylate" according to the CTFA (6th edition, 1995). They are sold for example under the references Aerosil R812 by Degussa and Cab-O-Sil TS-530 by Cabot, or dimethylsilyloxyl or polydimethylsiloxane groups, which are obtained in particular by treating fumed silica in the presence of polydimethylsiloxane, or methyldichlorosilane.

Silicas thus treated are known as "Silica dimethyl silylate" according to the CTFA (6th edition, 1995). They are sold for example under the references Aerosil R972 and Aerosil R974 by Degussa, and Cab-O-Sil TS-610 and Cab-O-Sil TS-720 by Cabot. The fumed silica preferably has a particle size that may be nanometric to micrometric, for example ranging from about 5 to 200 nm.

According to another preferred embodiment said addition curing type organopolysiloxane composition X is stored before use as a multi-component RTV comprising at least two separate packages which are preferably airtight, whereas the hydrosilylation catalyst C is not present in the same package with silicon compound B or with reactive diluent E when it is a silicon compound comprising a single silicon hydride group per molecule.

According to another preferred embodiment said addition curing type organopolysiloxane composition X is stored before use as a multi-component RTV comprising at least two separate packages which are preferably airtight:

a) the first package A1 comprising:
 100 parts by weight of at least one organopolyiloxane A according to the invention and as defined above,
 from 5 to 30 parts by weight of hollow glass beads D according to the invention and as defined above, and
 from 5 to 30 parts by weight of at least one reactive diluent E according to the invention and as defined above, and
 from 4 to 150 ppm based on metal platinum of a platinum based hydrosilylation catalyst C.

b) the second package A2 comprising:
 100 parts by weight of at least one organopolysiloxane A according to the invention and as defined above,
 from 10 to 70 parts by weight of a silicon compounds B one comprising two telechelic hydrogen atoms bonded to silicon per molecule according to the invention and as defined above,
 from 5 to 25 parts by weight of a silicon compounds B comprising at least three hydrogen atoms bonded to silicon per molecule according to the invention and as defined above,
 from 5 to 30 parts by weight of hollow glass beads D according to the invention and as defined above, and
 an effective amount of at least one cure rate controller G which slows the curing rate.

According to another preferred embodiment, the invention concerns a silicone rubber syntactic foam obtained by crosslinking said addition curing type organopolysiloxane composition X according to the invention and as defined above.

Another embodiment of the invention concerns a process for the preparation of the addition curing type organopolysiloxane composition X comprising the steps of:

a) feeding into a base feed line a liquid silicone base MS1 comprising:
 i) at least one organopolysiloxane A having at least two alkenyl groups bonded to silicon per molecule, said alkenyl groups each containing from 2 to 14 carbon atoms, preferably said alkenyl groups are chosen from the group consisting of vinyl, allyl, hexenyl, decenyl and tetradecenyl, and most preferably said alkenyl groups are vinyl groups, ii) hollow glass beads D, and preferably hollow borosilicate glass microspheres D1, iii) at least one silicon compound B having at least two and preferably at least three hydrogen atoms bonded to silicon per molecule, iv) at least one reactive diluent E for reducing the viscosity of the composition and which reacts through hydrosilylation reaction and is chosen from the group consisting of:

a silicon compound comprising a single silicon hydride group per molecule, and an organic compound containing a single ethylenically unsaturated group, preferably said organic compound is an organic α-olefin containing from 3 to 20 carbon atoms, and most preferably chosen from the group consisting of dodecene, tetradecene, hexadecene, octadecene and a combination of these and all with a terminal vinyl group, and an organopolysiloxane having a single telechelic alkenyl group, and preferably said telechelic alkenyl group is chosen from the group consisting of vinyl, allyl, hexenyl, decenyl and tetradecenyl, and most preferably is a vinyl group, and v) optionally a cure rate controller G which slows the curing rate, b) feeding into a catalyst feed line a catalyst master batch MC comprising:

i) at least one hydrosilylation catalyst C; and ii) optionally, at least one organopolysiloxane A having at least two alkenyl groups bonded to silicon per molecule, said alkenyl groups each containing from 2 to 14 carbon atoms, preferably said alkenyl groups are chosen from the group consisting of vinyl, allyl, hexenyl, decenyl and tetradecenyl, and most preferably said alkenyl groups are vinyl groups;

c) feeding into an inhibitor feed line an inhibitor master batch MI comprising:

i) a cure rate controller G which slows the curing rate; and ii) optionally, at least one organopolysiloxane A having at least two alkenyl groups bonded to silicon per molecule, said alkenyl groups each containing from 2 to 14 carbon atoms, preferably said alkenyl groups are chosen from the group consisting of vinyl, allyl, hexenyl, decenyl and tetradecenyl, and most preferably said alkenyl groups are vinyl groups; and d) optionally feeding into an additive feed line an additive masterbatch MA comprising:

i) at least one additive H such as a pigment, a dye, clays, a surfactant, hydrogenated castor oil, wollastonite, aluminium trihydrate, magnesium hydroxide, halloysite, huntite, hydromagnesite, expandable graphite, zinc borate, mica or a fumed silica, and ii) optionally at least one organopolysiloxane A having at least two alkenyl groups bonded to silicon per molecule, said alkenyl groups each containing from 2 to 14 carbon atoms, preferably said alkenyl groups are chosen from the group consisting of vinyl, allyl, hexenyl, decenyl and tetradecenyl, and most preferably said alkenyl groups are vinyl groups; and e) directing said liquid silicone base MS1, said catalyst master batch MC and said inhibitor master batch MI and optionally said additive masterbatch MA into a tank to obtain the addition curing type organopolysiloxane composition X.

The first advantage of said preferred embodiment relies on that the reaction rate of the crosslinking for the addition curing type organopolysiloxane composition X is regulated by the addition of a cure rate controller G. As the addition of this essential component is done via using a specific feed line, the level of inhibitor can be easily modified by the operator which allows him to increase the rate of cure or reduce the temperature at which rapid curing will begin. This is a key advantage as the configuration of the newly designed secondary battery packs involve more and more complex shapes which implies to adjust with caution on a case by case the curing rate.

The second main advantage relies that it is now possible to reduce the level of inhibitor and so to reduce the temperature at which rapid curing begins. This can be important if there are components within the battery pack that are somewhat temperature sensitive.

Another embodiment of the invention concerns also a process for the preparation of the addition curing type organopolysiloxane composition X comprising the steps of:

a) feeding into a base feed line a liquid silicone base MS2 comprising:

i) at least one organopolysiloxane A having at least two alkenyl groups bonded to silicon per molecule, said alkenyl groups each containing from 2 to 14 carbon atoms, preferably said alkenyl groups are chosen from the group consisting of vinyl, allyl, hexenyl, decenyl and tetradecenyl, and most preferably said alkenyl groups are vinyl groups, and ii) at least one silicon compound B having at least two and preferably at least three hydrogen atoms bonded to silicon per molecule, iii) optionally a cure rate controller G which slows the curing rate, iv) at least one reactive diluent E for reducing the viscosity of the composition and which reacts through hydrosilylation reaction and is chosen from the group consisting of:

a silicon compound comprising a single silicon hydride group per molecule, and an organic compound containing a single ethylenically unsaturated group, preferably said organic compound is an organic α-olefin containing from 3 to 20 carbon atoms, and most preferably chosen from the group consisting of dodecene, tetradecene, hexadecene, octadecene and a combination of these and all with a terminal vinyl group, and an organopolysiloxane having a single telechelic alkenyl group, and preferably said telechelic alkenyl group is chosen from the group consisting of vinyl, allyl, hexenyl, decenyl and tetradecenyl, and most preferably is a vinyl group, and b) feeding into a catalyst feed line a catalyst master batch MC comprising:

i) at least one hydrosilylation catalyst C; and ii) optionally, at least one organopolysiloxane A having at least two alkenyl groups bonded to silicon per molecule, said alkenyl groups each containing from 2 to 14 carbon atoms, preferably said alkenyl groups are chosen from the group consisting of vinyl, allyl, hexenyl, decenyl and tetradecenyl, and most preferably said alkenyl groups are vinyl groups;

c) feeding into an inhibitor feed line an inhibitor master batch MI comprising:

i) a cure rate controller G which slows the curing rate; and ii) optionally, at least one organopolysiloxane A having at least two alkenyl groups bonded to silicon per molecule, said alkenyl groups each containing from 2 to 14 carbon atoms, preferably said alkenyl groups are chosen from the group consisting of vinyl, allyl, hexenyl, decenyl and tetradecenyl, and most preferably said alkenyl groups are vinyl groups; and d) optionally feeding into an additive feed line an additive masterbatch MA comprising:

i) at least one additive H such as a pigment, a dye, clays, a surfactant, hydrogenated castor oil, wollastonite, aluminium trihydrate, magnesium hydroxide, halloysite, huntite hydromagnesite, expandable graphite, zinc borate, mica or a fumed silica, and ii) optionally at least one organopolysiloxane A having at least two alkenyl groups bonded to silicon per molecule, said alkenyl groups each containing from 2 to 14 carbon atoms, preferably said alkenyl groups are chosen from the group consisting of vinyl, allyl, hexenyl, decenyl and tetradecenyl, and most preferably said alkenyl groups are vinyl groups;

e) directing said liquid silicone base MS2, said catalyst master batch MC and said inhibitor master batch MI and optionally said additive masterbatch MA into a stirring tank; and f) operating said stirring tank, thereby mixing said liquid silicone base MS1, said catalyst master batch MC and said inhibitor master batch MI and optionally said additive masterbatch MA preferably by using a high flow, low-shear mixer, and g) adding hollow glass beads D and preferably hollow borosilicate glass microspheres D1 into said stirring tank, preferably by means using gravity discharge or screw feeder to obtain the addition curing type organopolysiloxane composition X.

BRIEF DESCRIPTION OF THE DRAWINGS

FIG. 1 shows a method for producing an addition curing type organopolysiloxane composition X according to one embodiment of the invention wherein said liquid silicone base MS1 is stored in a storage tank 1, said catalyst master batch MC is stored in a storage tank 20, said inhibitor master batch MI is stored in a storage tank 50 and said additive masterbatch MA is stored in a storage tank 65 and are fed separately into their respective feed lines 200, 210, 220 and 230 respectively. The storage tank 1 of the liquid silicone base MS2 is connected to the stirring tank 80 via a feed pump 10, which can be any large displacement pump, and via an optional feed rate adjuster 15. The storage tank 20 of the catalyst master batch MC is connected to the stirring tank 80 via a feed pump 25, which can be any small piston displacement pump, gear pump, micro motion injector pump, or other positive displacement pump, and via an optional feed rate adjuster 30. The storage tank 50 of the inhibitor master batch MI is connected to the stirring tank 80 via a feed pump 55, which can be any small piston displacement pump, gear pump, micro motion injector pump, or other positive displacement pump, and via an optional feed rate adjuster 60. The storage tank 65 of the additive masterbatch MA is connected to the stirring tank 80 via a feed pump 70, which can be any small piston displacement pump, gear pump, micro motion injector pump, or other positive displacement pump, and via an optional feed rate adjuster 75. When said liquid silicone base MS2, said catalyst master batch MC and said inhibitor master batch MI and optionally said additive masterbatch MA are directed into said stirring tank 80; the resulting mixture is mixed preferably by using a high flow, low-shear mixer to yield the addition curing type organopolysiloxane composition X according to the invention. Said composition is now available to be introduced into for example a battery module casing of an electric battery by mean 100 which could be either via an injection apparatus or via a pump to allow free flow to fill the free spaces of said battery module casing and cures via crosslinking.

FIG. 2 shows a method for producing an addition curing type organopolysiloxane composition X according to another embodiment of the invention wherein said liquid silicone base MS2 is stored in a storage tank 1, said catalyst master batch MC is stored in a storage tank 20, said inhibitor master batch MI is stored in a storage tank 50 and said additive masterbatch MA is stored in a storage tank 65 and are fed separately into their respective feed lines 200, 210, 220 and 230 respectively. The storage tank 1 of the liquid silicone base MS2 is connected to the stirring tank 80 via a feed pump 10, which can be any large displacement pump, and via an optional feed rate adjuster 15. The storage tank 20 of the catalyst master batch MC is connected to the stirring tank 80 via a feed pump 25, which can be any small piston displacement pump, gear pump, micro motion injector pump, or other positive displacement pump, and via an optional feed rate adjuster 30. The storage tank 50 of the inhibitor master batch MI is connected to the stirring tank 80 via a feed pump 55, which can be any small piston displacement pump, gear pump, micro motion injector pump, or other positive displacement pump, and via an optional feed rate adjuster 60. The storage tank 65 of the additive masterbatch MA is connected to the stirring tank 80 via a feed pump 70, which can be any small piston displacement pump, gear pump, micro motion injector pump, or other positive displacement pump, and via an optional feed rate adjuster 75. When said liquid silicone base MS2, said catalyst master batch MC and said inhibitor master batch MI and optionally said additive masterbatch MA are directed into said stirring tank 80; the resulting mixture is mixed preferably by using a high flow, low-shear mixer. To said resulting mixture, hollow glass beads D and preferably hollow borosilicate glass microspheres D1 which are stored in storage tank 90, which is preferably a hopper, are transferred into said stirring tank 80 either directly by gravity discharge or via screw feeder 95 to yield addition curing type organopolysiloxane composition X according to the invention. Said composition is now available to be introduced into for example a battery module casing of an electric battery by mean 100 which could be either via an injection apparatus or via a pump to allow free flow to fill the free spaces of said battery module casing and cures via crosslinking.

Figure 1:
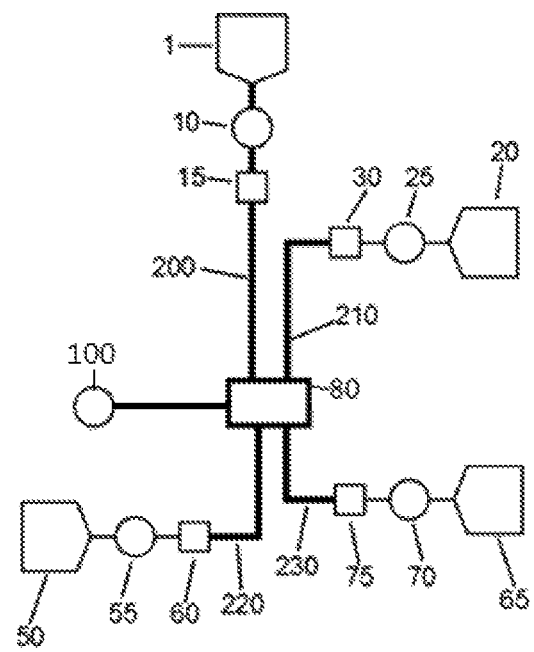
FIGS. 1 and 2 provide a schematic representation of two preferred embodiments of a method for producing an addition curing type organopolysiloxane composition X wherein the inhibitor master batch MI and catalyst master batch MC are separately fed into other components so as to control the curing rate.
Figure 2:
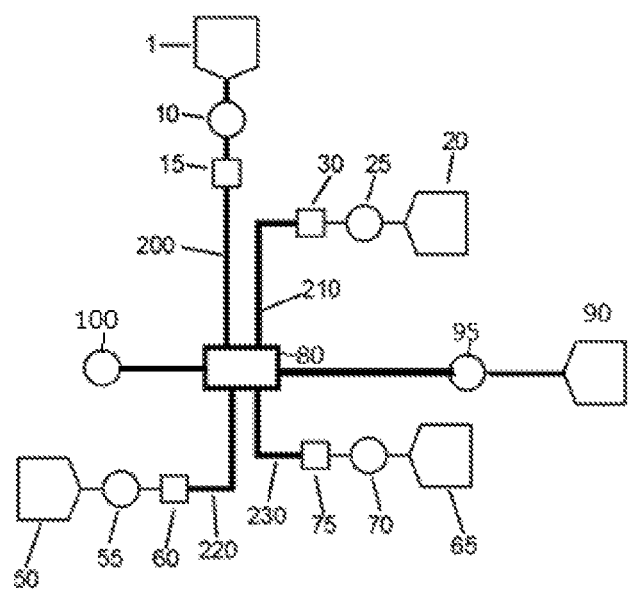

Other advantages provided by the present invention will become apparent from the following illustrative examples.

EXAMPLES

I) Definition of the Components

Organopolysiloxane A1=polydimethylsiloxane with dimethylvinylsilyl end-units with a viscosity at 25° C. ranging from 80 mPa·s to 120 mPa·s;

Organopolysiloxane A2=polydimethylsiloxane with dimethylvinylsilyl end-units with a viscosity at 25° C. ranging from 500 mPa·s to 650 mPa·s;

Organopolysiloxane B1 (CE) as chain extender=polydimethylsiloxane with dimethylsilylhydride end-units with a viscosity at 25° C. ranging from 7 mPa·s to 10 mPa·s and formula: M'D$_x$M'

In which:

D is a siloxy unit of formula $(CH_3)_2SiO_{2/2}$

M' is a siloxy unit of formula $(CH_3)_2(H)SiO_{1/2}$ and x is an integer ranging from 8 to 11;

Organopolysiloxane B2 (XL) as crosslinker, with a viscosity at 25° C. ranging from 18 mPa·s to 26 mPa·s, over 10 SiH reactive groups are present (in average from 16 to 18 SiH reactive groups): poly(methylhydrogeno)(dimethyl)siloxane with SiH groups in-chain and end-chain (α/ω), Hollow glass beads D1: 3M™ Glass Bubbles Series S15, sold by 3M Company, Particle Size (50%) microns by volume=55 microns, Isostatic Crush Strength: Test Pressure 300 psi (2.07 MPa.), True Density (g/cc) =0.15.

Hollow glass beads D2: 3M™ iM16K Glass Bubbles, sold by 3M Company, (Particle Size (50%) microns by volume=20 microns, Isostatic Crush Strength Test Pressure 16,000 psi, True Density (g/cc)=0.46.

Cure rate controller G1: 1,3,5,7-tetramethyl-1,3,5,7-tetravinyl-cyclotetrasiloxane.

Cure rate controller G2: 1-Ethynyl-1-cyclohexanol (ECH).

Cure rate controller G3-MB: 90% by weight of Organopolysiloxane A1 and 10% by weight of cure rate controller G2.

Catalyst C: 10% platinum as Karstedt catalyst in 350 cS dimethylvinyldimer, sold by Johnson Matthey Company.

Catalyst C-MB: 98% by weight of Organopolysiloxane A1 and 2% by weight of Catalyst C.

Reactive diluent E=1-tetradecene.

TABLE 1

Inventive two-parts formulation 1 precursor of a silicone rubber syntactic foam

| | Parts by weight |
|---|---|
| Part A | |
| Organopolysiloxane A1 | 81.88 |
| Reactive diluent E | 5.03 |
| Catalyst C | 0.037 |
| hollow glass beads D1 | 13.05 |
| Part B | |
| Organopolysiloxane A1 | 81.88 |
| Organopolysiloxane B2 (XL) | 8.6 |
| Organopolysiloxane B1 (CE) | 53.41 |
| Cure rate controller G1 | 0.01 |
| hollow glass beads D1 | 13.05 |

TABLE 2

Inventive two-parts formulation 2 precursor of a silicone rubber syntactic foam.

| | Parts by weight |
|---|---|
| Part A | |
| Organopolysiloxane A1 | 78.27 |
| Reactive diluent E | 8.62 |
| Catalyst C | 0.063 |
| hollow glass beads D1 | 13.05 |
| Part B | |
| Organopolysiloxane A1 | 69.23 |
| Organopolysiloxane B2 (XL) | 2.46 |
| Organopolysiloxane B1 (CE) | 15.26 |
| Cure rate controller G1 | 0.0029 |
| hollow glass beads D1 | 13.05 |

For two-parts formulation 1, parts A and B were combined as a 6:1 w/w (weight ratio) to prepare the compositions I before curing For two-parts formulation 2, parts A and B were combined as a 1:1 w/w (weight ratio) to prepare the compositions II before curing Each composition 1 and 2 were cured at room temperature to yield a silicone rubber syntactic foam comprising a silicone rubber binder and hollow glass beads.

Other formulations were prepared according to the invention and are described in Table 3. Each formulation was cured to yield a silicone rubber syntactic foam according to the invention. Thermal Conductivity (W/mK) and specific gravity (g/cm3) were measured. Thermal conductivity was measured using a Thermtest Hot Disk TPS (Transient Plane Source) 2500S Tester.

TABLE 2

Inventive two-parts formulations 3, 4 & 5 precursor of a silicone rubber syntactic foam.

| Mix Ratio 1:1 by weight | Formulation 3 (Invention) | Formulation 4 (Invention) | Formulation 5 (Invention) |
|---|---|---|---|
| Part A | | | |
| Organopolysiloxane A2 | 89.09% | 89.09% | 89.09% |
| Hollow glass beads D2 | 9.09% | 9.09% | 9.09% |
| Catalyst C-MB | 1.82% | 1.82% | 1.82% |
| Total | 100.00% | 100.00% | 100.00% |

TABLE 2-continued

Inventive two-parts formulations 3, 4 & 5 precursor of a silicone rubber syntactic foam.

| Mix Ratio 1:1 by weight | Formulation 3 (Invention) | Formulation 4 (Invention) | Formulation 5 (Invention) |
|---|---|---|---|
| Part B | | | |
| Organopolysiloxane A2 | 80.627% | 78.124% | 74.097% |
| Hollow glass beads D2 | 9.091% | 9.091% | 9.091% |
| Organopolysiloxane B1 (CE) | 8.479% | 9.943% | 13.640% |
| Reactive diluent E | 0.909% | 1.818% | 1.818% |
| Organopolysiloxane B2 (XL) | 0.756% | 0.886% | 1.216% |
| Cure rate controller G3-MB | 0.138% | 0.138% | 0.138% |
| Total | 100.000% | 100.000% | 100.000% |
| (H as SiH)/Vinyl Molar Ratio | 0.72 | 0.72 | 1.00 |
| Form when cured | Sticky Gel | Sticky Gel | Gel/Elastomer |
| Thermal Conductivity W/mK | 0.17 | 0.18 | 0.18 |
| Specific Gravity of the syntactic foam ASTM D 792, 23° C. | 0.87 | 0.87 | 0.87 |

We claim:

1. An addition curing type organopolysiloxane composition X, wherein the addition curing type organopolysiloxane composition X is stored before use as a multi-component RTV comprising at least two separate packages:
   a) the first package A1 comprising:
   100 parts by weight of at least one organopolyosiloxane A of the following formula:

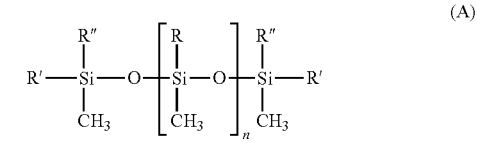

(A)

in which:
   R and R″ are chosen independently of one another from the group consisting of methyl, ethyl, propyl, trifluoropropyl, and phenyl,
   R′ is a $C_1$ to $C_{20}$ alkenyl radical, and
   n is an integer having a value from 5 to 1000,
from 4 to 150 ppm based on metal platinum of a platinum-based hydrosilylation catalyst C,
from 5 to 30 parts by weight of hollow glass beads D which are hollow borosilicate glass microspheres, and
from 5 to 30 parts by weight of at least one reactive diluent E for reducing the viscosity of the composition and which reacts through hydrosilylation reaction and is chosen from the group consisting of:
   a silicon compound comprising a single silicon hydride group per molecule, and
   an organic compound containing a single ethylenically unsaturated group chosen from the group consisting of dodecene, tetradecene, hexadecene, octadecene and a combination of these and all with a terminal vinyl group, and
   an organopolysiloxane having a single telechelic alkenyl group chosen from the group consisting of vinyl, allyl, hexenyl, decenyl and tetradecenyl,
   b) the second package A2 comprising:
   100 parts by weight of at least one organopolyosiloxane A of the following formula:

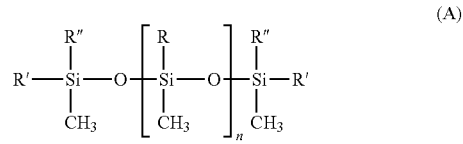

(A)

in which:
   R and R″ are chosen independently of one another from the group consisting of methyl, ethyl, propyl, trifluoropropyl, and phenyl,
   R′ is a $C_1$ to $C_{20}$ alkenyl radical, and
   n is an integer having a value from 5 to 1000,
from 10 to 70 parts by weight of a silicon compound B1 comprising two telechelic hydrogen atoms bonded to silicon per molecule,
from 5 to 25 parts by weight of a silicon compound B2 comprising at least three hydrogen atoms bonded to silicon per molecule,
from 5 to 30 parts by weight of hollow glass beads D which are hollow borosilicate glass microspheres, and
an effective amount of at least one cure rate controller G which slows the curing rate;
wherein the hydrosilylation catalyst C is not present in the same package with silicon compound B or with reactive diluent E when it is a silicon compound comprising a single silicon hydride group per molecule.

2. The addition curing type organopolysiloxane composition X according to claim 1, wherein the hollow borosilicate glass microspheres have true density ranging from 0.10 gram per cubic centimeter to 0.65 gram per cubic centimeter.

3. The addition curing type organopolysiloxane composition X according to claim 1, wherein the at least one reactive diluent E:
   is chosen from the group consisting of dodecene, tetradecene, hexadecene, octadecene or a combination of these and all having a terminal vinyl group, or is a liquid organopolysiloxane with formula I

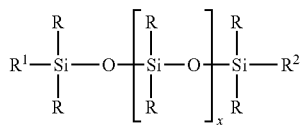

In which:
R and $R^2$ are chosen independently of one another from a $C_1$ to $C_{30}$ hydrocarbon radical,
R' is chosen from the group consisting of vinyl, allyl, hexenyl, decenyl, and tetradecenyl, and
x is between 0 and 100, and is chosen so that it will lower the viscosity of addition curing type organopolysiloxane composition X compared to same composition without the reactive diluent.

4. The addition curing type organopolysiloxane composition X according to claim 1, wherein:
the viscosity at 25° C. of said at least one organopolysiloxane A is between 5 mPa·s and 60000 mPa·s; and
wherein said silicon compound B1 comprising two telechelic hydrogen atoms bonded to silicon per molecule does not comprise pendent hydrogen atoms bonded to silicon and wherein the viscosity at 25° C. of said silicon compound B1 comprising two telechelic hydrogen atoms bonded to silicon per molecule with no pendent hydrogen atoms bonded to silicon per molecule is between 5 and 100 mPa·s, and
wherein the viscosity at 25° C. of said silicon compound B2 comprising at least three hydrogen atoms bonded to silicon per molecule is between 5 and 2000 mPa·s.

5. The addition curing type organopolysiloxane composition X according to claim 1, wherein the viscosities at 25° C. of said at least one organopolysiloxane A and said silicon compounds B1 and B2 are chosen so that the viscosity at 25° C. of the addition curing type organopolysiloxane composition X is between 500 mPa·s to 5000 mPa·s.

6. The addition curing type organopolysiloxane composition X according to claim 1, wherein the proportions in weight of the at least one organopolysiloxane A, the at least one reactive diluent E, and the silicon compounds B1 and B2 are such that the overall molar ratio of the hydrogen atoms bonded to the silicon to the overall alkenyl radicals bonded to the silicon is within a range from 0.35 to 10.

7. A silicone rubber syntactic foam obtained by crosslinking said addition curing type organopolysiloxane composition X as defined in claim 1.

8. The addition curing type organopolysiloxane composition X according to claim 1, wherein the at least one organopolyosiloxane A is at least one organosiloxane A of the following formula:

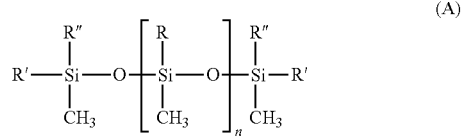

(A)

in which:
R and R" are each methyl groups,
R' is a vinyl radical, and
n is an integer having a value from 5 to 100.

9. The addition curing type organopolysiloxane composition X according to claim 1, further comprising
at least one additive H.

* * * * *